United States Patent [19]

Milberger et al.

[11] 3,907,834

[45] Sept. 23, 1975

[54] PROCESS FOR PRODUCING MALEIC ANHYDRIDE

[75] Inventors: Ernest C. Milberger, Solon; Serge R. Dolhyj, Parma; Harley F. Hardman, Lyndhurst, all of Ohio

[73] Assignee: The Standard Oil Company, Cleveland, Ohio

[22] Filed: Sept. 1, 1971

[21] Appl. No.: 177,105

[52] U.S. Cl. ............ 260/346.8; 252/456; 252/464; 252/468; 252/467; 252/470
[51] Int. Cl. ......................................... C07c 57/14
[58] Field of Search .................... 260/346.8, 533 N

[56] References Cited
FOREIGN PATENTS OR APPLICATIONS
1,155,176  6/1969  United Kingdom.......... 260/346.8 X
1,157,117  7/1969  United Kingdom
7,125,736  7/1971  Japan Primary Examiner—Henry R. Jiles
Assistant Examiner—Bernard Dentz
Attorney, Agent, or Firm—Herbert D. Knudsen

[57] ABSTRACT

The process in this invention relates to the conversion of organic compounds selected from the group consisting of the n-butylenes, butadiene, crotonaldehyde and furan in a selective manner to maleic anhydride in the presence of a catalyst comprising the mixed oxides of antimony and molybdenum.

7 Claims, No Drawings

PROCESS FOR PRODUCING MALEIC ANHYDRIDE

This invention relates to a process for the manufacture of maleic anhydride by the catalytic oxidation of unsaturated organic compounds containing at least four carbon atoms. More particularly this invention relates to the conversion of organic compounds selected from the group consisting of the n-butylenes, butadiene-1,3, crotonaldehyde and furan to maleic anhydride in the presence of a catalyst comprising the mixed oxides of antimony and molybdenum. Also within the scope of this invention is the method for preparing the catalyst employed in this process.

The catalyst of this invention is composed of the oxides of molybdenum and antimony and optionally may contain other metal oxides. The catalyst compositions most useful in this invention are represented by the following formula:

$$A_a Mo_b Sb_c O_d$$

wherein A is a member selected from the group consisting of molybdenum, tungsten, magnesium, aluminum and nickel, and wherein $a$ is a number of from 0 to 0.2, $b$ is a number of from 1 to 9, $c$ is a number from 1 to 9 and $d$ is a number dependent upon the valence requirements of the combined metals and may vary from about 20 to 30. The preferred catalysts include those compositions wherein A is molybdenum or tungsten and wherein $a$ is 0 to 0.12, $b$ is 2 to 8, $c$ is 2 to 8 and $d$ is 20 to 30.

Excellent per pass conversions of the starting material to maleic anhydride in the range of 70 to 80 percent on a mole basis are obtained with the catalyst of this invention. Selectivity of the reaction for anhydride production improves markedly with an increase in molybdenum content, while catalysts with low molybdenum content produce predominantly waste materials.

Maximum conversions to maleic anhydride are obtained where the starting material is butadiene-1,3 and/or crotonaldehyde, while conversions of the n-butylenes (butene-1 and butene-2) to the anhydride are generally somewhat lower. The major by-products obtained in the oxidation of n-butylenes however are butadiene and crotonaldehyde which on recycle can be readily converted to maleic anhydride in nearly theoretical yields.

Essentially all of the product produced in this process is maleic anhydride with only minor amounts of acetic acid and acrylic acid being detected in the reaction product. Minor amounts of other carbonylic compounds in addition to crotonaldehyde are also obtained as by-products in the reaction product of our process, and such carbonyls as acetaldehyde, formaldehyde, furan, acrolein, and acetone have been identified by various analytical procedures including gas chromatography and mass spectroscopy. The amount of by-product obtained is dependent upon the starting material employed with the least amount of by-product being obtained with butadiene and crotonaldehyde.

The process of this invention is carried out in the vapor phase in a fixed-bed or a fluid-bed reactor. The reaction conditions may vary considerably. The process may be carried out in the temperature range of from about 650° to 850°F. and preferably in the range of from about 700° to 800°F. Below a temperature of about 650°F. total conversion drops. Above about 850°F. there is increased conversion to the by-products.

The reactor pressure in the instant process may vary from about 1 to 500 psia and preferably ranges from about 10 to 100 psia. Molecular oxygen or a molecular oxygen-containing gas is employed in the reaction and oxygen may be present in the molar ratio of oxygen to the unsaturated organic compound of from about 1:1 to 40:1, and preferably in a ratio of 3:1 to 10:1, respectively. The use of steam in the reaction is optional and steam may be included in the feed to the reactor in amounts ranging from 0 to 50 moles of steam per mole of the organic compound. The apparent contact time in this process can vary from 0.1 to 50 seconds and preferably from about 0.5 to 10 seconds.

The method used for preparing the catalyst of this invention is critical to the process for producing maleic anhydride. The method employed departs from the usual classical procedures involving co-precipitation or impregnation techniques and preferredly involves the simple mixing of the respective metal oxides of antimony trioxide and molybdenum trioxide. The mixing of the oxides may be carried out mechanically in a blender or in a ball mill, or the respective oxides may be mixed as a slurry in water. This initial step is followed by calcination at a moderate temperature, generally not above 1000°F. It is hypothesized that the blue-green color which develops in the catalyst is the result of the reduction of molybdenum, at least in part, to a lower oxidation state in the oxidation-reduction reaction occurring between hexavalent molybdenum and trivalent antimony.

A more reproducible method for combining the two oxides comprises essentially the refluxing of an aqueous suspension of antimony trioxide with molybdenum trioxide for a period of from about 1/2 to 16 hours and preferably from about 1 to 4 hours. The amount of water present in solution is not critical and can range from about 500 to 2000 milliliters per mole of molybdenum trioxide reacted. During this period the slurry darkens to a deep olive green color. Water is removed from the slurry by evaporation until a thick homogenous material is obtained which on drying at 110°C. overnight emerges as a dark green solid.

In a more preferred procedure, the molybdenum trioxide in an aqueous suspension is pre-reduced in a controlled manner so that at least some of the molybdenum is reduced to a valence state below +6 before the molybdenum oxide is mixed with the antimony trioxide. A wide range of reducing agents can be employed including finely divided or colloidal metals such as molybdenum, tungsten, magnesium, aluminum or nickel, stannous ion, sulfur dioxide, organic reducing agents, hydrazine hydrate, etc. When powdered metals are employed, the amount of metal reacted ranges from 0.01 to 0.2 atoms per mole of molybdenum trioxide present. On refluxing the aqueous suspension of molybdenum trioxide with the reducing agent, at least a part of the normally insoluble molybdenum trioxide is solubilized forming an intense deep blue coloration. Although preferredly the molybdenum trioxide is pre-reduced before reaction with the antimony trioxide, beneficial results are also obtained by first reacting the molybdenum trioxide with antimony trioxide followed by reaction with the reducing agent, or by reacting the three components simultaneously.

The catalyst of this invention may be supported on a carrier material such as for example, silica, zirconia, calcium stabilized-zirconia, titania, alumina, thoria, silicon carbide, clay, diatomaceous earth and the like, or it may be employed satisfactorily in an unsupported form. It a carrier is utilized it may be employed in amounts of from 5 to 95 percent by weight of the total catalyst composition.

The catalyst may be activated by calcining in air at a temperature of from about 700° to 1000°F. for a period of from 1 to 5 hours. More preferredly the catalyst is activated in a mixture of steam and air at a temperature of about 800°F. for from about 1 to 5 hours, followed by purging with air at a temperature of from 700° to 1000°F. for about one hour. Calcination at temperatures above about 1000°F. has an adverse effect on the catalyst.

X-ray diffraction examination of the freshly prepared catalysts shows the presence of molybdenum trioxide, and to a lesser extent, antimony trioxide. Air activation results in the incipient formation of new, and unidentified, crystalline phases. The crystalline pattern, as revealed by X-ray diffraction, undergores further change with time on stream under process conditions such that after several hours of operation, the diffraction patterns for both starting oxides are no longer present. The new pattern indicates a highly crystalline structure of a new phase which is characteristic for highly active and selective behavior.

Preparation of the catalyst of this invention by the process described herein results in a catalyst with a composition and properties that are readily reproduced, a catalyst that has a greatly reduced bulk density, and one that displays excellent life characteristics. There are strong indications that the activity of the catalyst improves with use.

The process of this invention is further illustrated by the following specific examples, but is not to be limited by the examples presented herein. The effect on per pass conversions to maleic anhydride of catalyst composition, method of catalyst preparation, nature of the feed stock and reaction conditions employed are demonstrated by Examples 1 through 29 shown in Tables I to III.

The catalyst employed in the examples shown in Tables I to III were prepared according to the following procedures.

EXAMPLE 1

$MoO_3$ 200 grams of molybdenum trioxide (Fisher, Reagent Grade) was slurried in 1500 milliliters of distilled water and refluxed for 16 hours. The slurry was evaporated to a thick paste and dried overnight at 110°C. The resulting material was ground and screened to obtain a fraction of 20–30 mesh size. The catalyst was pre-treated in a 20-milliliter fixed-bed reactor by heating to 800°F. in a stream of air for two hours.

EXAMPLE 2

$Sb_{0.95}Mo_9O_{28.6}$ 273.5 grams of molybdenum trioxide and 29.2 grams of antimony trioxide were slurried in 1500 milliliters of distilled water. The slurry was heated and allowed to reflux overnight, after which the mixture was evaporated to a thick paste and dried at 110°C. overnight. The resulting material was hard and was olive green in color. The catalyst was ground and screened to 20–30 mesh and was pre-treated as in Example 1.

EXAMPLE 3

$Sb_{2.6}Mo_{7.4}O_{26.1}$ The procedure of Example 2 was repeated except that the ratio of components was adjusted to give the composition indicated.

EXAMPLE 4

$Sb_4Mo_6O_{24}$ The procedure of Example 2 was repeated except that the ratio of components was adjusted to give the composition indicated.

EXAMPLE 5

$Sb_{6.7}Mo_{3.3}O_{19.95}$ The procedure of Example 2 was repeated except that the ratio of components was adjusted to give the composition indicated.

EXAMPLE 6

$Sb_{8.6}Mo_{1.4}O_{17.2}$ The procedure of Example 2 was repeated except that the ratio of components was adjusted to give the composition indicated.

EXAMPLE 7

$80\%(Sb_4Mo_6O_{24})-20\%(ZrO_2-CaO)$ 72 grams of $MoO_3$ and 48.6 grams of $Sb_2O_3$ were slurried in 1000 milliliters of distilled water and refluxed for 16 hours. 30.2 grams of Zircoa B were added to the above slurry, and the slurry was evaporated to a thick paste and dried overnight at 110°C. The dried material was hard and was dark green in color. A 20–30 mesh fraction of the catalyst was pre-treated as in Example 1.

EXAMPLE 8

$80\%(Sb_4Mo_6O_{24})-20\%TiO_2$ The same procedure was employed as in Example 7, except that the slurry was refluxed for 2.5 hours and 30.2 grams of Anatase ($TiO_2$) was used as the support material in place of Zircoa B.

EXAMPLE 9

$80\%(Sb_4Mo_6O_{24})-20\%SiO_2$ The procedure of Example 7 was repeated except that 100.5 grams of 30% silica sol were used as the support material in place of Zircoa B.

EXAMPLE 10

$Sb_4Mo_6O_{24}$ The procedure of Example 7 was repeated except that no supporting material was used.

EXAMPLE 11

The catalyst of Example 10 was activated by placing the catalyst in the reactor and heating to 800°F. for 4 hours in an atmosphere of 90% steam and 10% air. This was followed by passing an air stream over the catalyst for one hour at 800°F.

EXAMPLE 12

$Sb_4Mo_6O_{24}$ Four separate batches each containing 143.9 grams molybdenum trioxide and 97.2 grams antimony trioxide were refluxed in 1000 mls. distilled water for 2 ½ hours, and were evaporated and dried overnight at 120°C. The dried materials were mixed together, then ground and screened to 20/30 mesh. The resulting material was hard and olive green in color. Pre-treatment was identical to that in Example 1.

EXAMPLE 13

The catalyst was the same as that in Example 12.

EXAMPLE 14

$Mo_{0.12}Sb_4Mo_6O_{24.4}$ 72 grams of $MoO_3$ and 0.95 grams of molybdenum metal powder (99.8%) were slurried in 1000 mls. of distilled water and refluxed for two hours. 48.6 grams of $Sb_2O_3$ were then added, and refluxing continued for an additional two hours. The slurry was then evaporated to a thick paste, which was then dried overnight at 110°C. The resulting dark greenish-black material was ground and screened to 20–30 mesh. The catalyst was pre-treated as in Example 1.

EXAMPLE 15

$Mo_{0.12}Sb_4Mo_6O_{24.4}$ 72 grams of $MoO_3$, 0.95 grams of molybdenum metal power and 48.6 grams of $Sb_2O_3$ were slurried in one liter of distilled water. The slurry was refluxed for 3 hours and then evaporated to a thick paste. The catalyst was then dried overnight at 110°C. and ground and screened to 20–30 mesh. The catalyst was pre-treated as in Example 1.

EXAMPLE 16

$Mo_{0.12}Sb_4Mo_6O_{24.4}$ 72 grams of $MoO_3$ and 48.6 grams of $Sb_2O_3$ were slurried in one liter of distilled water. The slurry was refluxed for 3 hours. To this slurry was added 0.95 grams of molybdenum metal powder and reluxing was continued for one hour. The slurry was then evaporated, dried and screened to 20–30 mesh. The catalyst was pretreated as in Example 1.

EXAMPLE 17

$Sb_4Mo_6O_{24}$ 288 grams of $MoO_3$ and 194.3 grams of $Sb_2O_3$ were ball milled for 24 hours. The mix was screened through a 200 mesh sieve and then pelleted. The pellets were calcined in air for one hour at 150°F. and then for 2 ½ hours at 750°F.

EXAMPLE 18

$Mo_{0.12}Sb_4Mo_6O_{24.4}$ The procedure of Example 14 was repeated.

EXAMPLE 19

$W_{0.12}Sb_4Mo_6O_{24.4}$ The same procedure of Example 14 was employed except that 1.84 grams of tungsten metal powder were used in place of the molybdenum powder.

EXAMPLE 20

$Mg_{0.12}Sb_4Mo_6O_{24.1}$ The procedure of Example 14 was used except that 0.24 gram of magnesium metal powder was employed in place of the molybdenum powder.

EXAMPLE 21

$Al_{0.12}Sb_4Mo_6O_{24.2}$ The procedure of Example 14 was employed except that 0.27 gram of aluminum metal powder was used in place of molybdenum powder.

EXAMPLE 22

$Ni_{0.12}Sb_4Mo_6O_{24.1}$ The procedure of Example 14 was employed except that 0.59 gram of nickel metal powder was used in place of the molybdenum powder.

EXAMPLE 23

$Sb_4Mo_6O_{24}$ The preparation was the same as in Example 14 except that 0.75 gram of hydrazine hydrate was used in place of the molybdenum powder.

EXAMPLE 24

$Mo_{0.12}Sb_4Mo_6O_{24.4}$ Catalyst of Example 14 was used.

EXAMPLES 25–28

$Sb_4Mo_6O_{24}$ The catalyst of Example 4 was used.

The oxidation reactions summarized in Tables I to III were conducted in a 20 cc, fixed-bed, down-flow reactor consisting of a length of ½ inch stainless steel tubing equipped with a full length ⅛ inch axial thermowell. catalyst mesh size was through 20 to 30 mesh. The reactor was heated with a split stainless steel block furnace.

The furnace assembly was immediately adjacent to two separate insulated constant temperature enclosures. A glass saturator vessel was mounted in each enclosure and provided a means for introducing normally liquid feeds, such as water or crotonaldehyde, to the reactor feed stream.

Air was supplied to the reactor through two rotameters and one stream was mixed with the feed. The mixed stream could be directed to the second metered air feed and then to the reactor, or it could be diverted to an analyzer for the measurement of rate and composition.

The primary receiver consisted of a 500-milliliter flask which functioned as an air condenser and most of the maleic anhydride was collected therein as a solid. The noncondensible gases passed through a water scrubber and the unabsorbed gases were vented. In certain instances an acetone scrubber was used and the scrubber liquid was analyzed directly for maleic anhydride by gas-liquid chromatography.

Product analyses of the aqueous scrubber liquid were conducted by determining total acid content by titration with standard base (0.1N sodium hydroxide) and maleic anhydride was determined by gravimetric precipitation of barium maleate. The scrubber liquid which contained carbonyl products such as acetaldehyde, furan, acrolein, methyl ethyl ketone, crotonaldehyde and acetone was analyzed by gas chromatography using a n-propanol internal standard and a three foot Poropak QS column in a F & M 810 Research Chromatograph. The analyses of the liquid products were conducted by comparing the response of the unknown sample with that of a standard.

The gravimetric method for analyzing maleic anhydride consisted of mixing 25 milliliters of the scrubber solution with 20 milliliters of a solution of 5% $BaCl_2.2H_2O$ and adding concentrated ammonium hydroxide to obtain a phenolphthalein reaction. The solution was then diluted to 150 milliliters with absolute alcohol. The filitered precipitate was dried at 110°C. for 2 to 3 hours and the maleic anhydride was calculated as barium maleate monohydrate, according to the method described in *J. Am. Chem. Soc.* 57, 1390, 1935.

In the examples given in Tables I to III, molar percent per pass conversion to maleic anhydride is defined as follows:

on a single pass of the starting material over the catalyst, $$\frac{\text{Grams of carbon as maleic anhydride obtained}}{\text{Grams of carbon as organic starting material fed}} \times 100$$

Selectivity to maleic anhydride is defined as:

$$\frac{\text{Grams of carbon as maleic anhydride obtained}}{\text{Grams of carbon as total acid obtained}} \times 100$$

The experimental examples summarized in Table I using butene-2 as the feed illustrate the effect of varying the ratio of antimony to molybdenum in the catalyst composition, the use of a carrier and the effect of catalyst activation. The conversions obtained with the various catalyst compositions shown in Examples 1 to 6 indicate that a broad composition range of antimony oxide to molybdenum oxide can be employed and that only at the extremes of the composition range does the activity for producing maleic anhydride decline.

Examples 7 to 9 indicate that the active catalyst may be effectively deposited on various support materials, and the beneficial effect of activating the catalyst with steam is indicated in Example 11.

The effect on catalytic acitivity of pre-reducing the molybdenum trioxide with a reducing agent, and the preparational sequence of adding the reducing agent during the preparation of the catalyst are shown by the examples in Table II employing butadiene as the feed. The improvement in activity by adding powdered molybdenum metal to the catalyst either before, during, or subsequent to the reaction of molybdenum trioxide with the antimony trioxide is shown in Examples 14 through 16. An increase in activity is also observed with other reducing agents incorporated into the catalyst such as tungsten, magnesium, aluminum, nickel and hydrazine (Examples 19 through 23). The improvement in catalytic activity obtained with a catalyst prepared by mixing the oxide components in an aqueous slurry as compared with dry-blending is shown by comparing Examples 12 and 13 with Example 17.

The effect of process variables on per pass conversion utilizing various feed stocks is shown by various examples in Tables I to III. The effect of employing reaction temperature below 700°F. is illustrated with crotonaldehyde in Examples 25 to 28 in Table III. These examples indicate that conversions to maleic anhydride drop sharply at a reaction temperature of about 650°F. Although maximum conversions to maleic anhydride are obtained at a temperature of about 750°F. substantial levels of conversions are obtained at temperatures as high as 850°F. Molar ratios of feed to air varying from 1:25 to 1:75 are also indicated in these same examples.

LIFE TEST EXPERIMENTS

The excellent life characteristics of the catalyst of this process was demonstrated for a period of about 2 months, employing the catalyst of Example 14 and butadiene as the feed. After this period of time the total amount of maleic anhydride produced increased from the initial per pass conversion of 72.4 percent to a conversion of 74.7 percent. Surprisingly the catalyst of this invention retains its activity through extremes in operating conditions, as for example, the use of very low air ratios and high hydrocarbon rates. These adverse conditions were maintained for overnight periods, followed by periods of normal operating conditions. After several cycles of this type of operation a final per pass conversion of butadiene to maleic anhydride of 76.8 percent was obtained as compared with a 75.3 percent conversion initially.

Table I

Conversions to Maleic Anhydride
Feed: Butene-2
Reactor: 20 cc Fixed-Bed

| Example | Bath Temp.(°F.) | Molar Feed Ratio HC | Molar Feed Ratio Air | C.T. (Sec.) | WWH | Mole % Per Pass Conversions to Total Acid | Mole % Per Pass Conversions to Maleic Anhydride | Selectivity to Maleic Anhydride (%) |
|---|---|---|---|---|---|---|---|---|
| | | | EFFECT OF CATALYST COMPOSITION | | | | | |
| 1 | 750 | 1 | 26 | 3.2 | 0.031 | 1.2 | — | Essentially zero |
| 2 | 800 | 1 | 29 | 3.1 | — | 19.9 | 18.8 | 94.5 |
| 3 | 850 | 1 | 31 | 2.9 | — | 21.7 | 19.6 | 90.3 |
| 4 | 750 | 1 | 26 | 3.1 | 0.026 | 31.4 | 27.2 | 86.6 |
| 5 | 700 | 1 | 28 | 3.2 | .050 | 30.7 | 24.6 | 80.1 |
| 6 | 750 | 1 | 25 | 3.0 | 0.064 | 31.9 | 26.4 | 82.75 |
| | | | EFFECT OF CATALYST SUPPORT | | | | | |
| 7 | 750 | 1 | 26 | 3.2 | — | 35.0 | 25.5 | 72.85 |
| 8 | 750 | 1 | 26 | 3.2 | — | 40.1 | 34.3 | 85.5 |
| 9 | 750 | 1 | 28 | 3.2 | — | 37.5 | 36.6 | 97.6 |
| 10 | 750 | 1 | 29 | 3.1 | — | 42.4 | 36.0 | 84.9 |
| | | | EFFECT OF CATALYST ACTIVATION | | | | | |
| 11 | 750 | 1 | 28 | 3.2 | — | 47.7 | 44.9 | 94.1 |

Table II

Feed: Butadiene
Reactor: 20 cc Fixed-Bed

| Example | Bath Temp.(°F.) | Molar Feed Ratio HC | Molar Feed Ratio Air | Molar Feed Ratio H₂O | C.T. (Sec.) | WWH | Mole % Per Pass Conversions to Total Acid | Mole % Per Pass Conversions to Maleic Anhydride |
|---|---|---|---|---|---|---|---|---|
| | | | | EFFECT OF CATALYST PREPARATION | | | | |
| 12 | 700 | 1 | 27 | — | 3.2 | 0.024 | 58.0 | 54.5 |
| 13 | 750 | 1 | 26 | — | 3.0 | 0.025 | 58.9 | 57.3 |
| 14 | 700 | 1 | 33 | — | 3.1 | 0.066 | 77.3 | 76.6 |
| 15 | 700 | 1 | 33 | — | 3.1 | 0.021 | 70.1 | 70.9 |
| 16 | 700 | 1 | 30 | — | 3.1 | 0.023 | 69.9 | 64.5 |
| 17 | 725 | 1 | 30 | — | 2.2 | — | — | 47.0 |
| 18 | 700 | 1 | 33 | — | 3.2 | 0.060 | 77.6 | 74.3 |

Table II—Continued

Feed: Butadiene
Reactor: 20 cc Fixed-Bed

| Example | Bath Temp.(°F.) | Molar Feed Ratio | | | C.T. (Sec.) | WWH | Mole % Per Pass Conversions to | |
|---|---|---|---|---|---|---|---|---|
| | | HC | Air | H₂O | | | Total Acid | Maleic Anhydride |
| 19 | 700 | 1 | 26 | — | 3.1 | 0.061 | 74.4 | 68.9 |
| 20 | 750 | 1 | 27 | — | 3.0 | 0.050 | 68.0 | 61.9 |
| 21 | 750 | 1 | 27 | — | 3.0 | 0.051 | 71.3 | 65.3 |
| 22 | 750 | 1 | 30 | — | 3.0 | 0.042 | 63.9 | — |
| 23 | 700 | 1 | 22 | — | 3.2 | 0.068 | 73.5 | — |
| | | EFFECT OF PROCESS STEAM | | | | | | |
| 24 | 700 | 1 | 32 | 17 | 2.1 | 0.067 | 80.7 | 70.1 |

Table III

Conversions to Maleic Anhydride
Feed: Crotonaldehyde
Reactor: 20 cc Fixed-Bed

| Example | Bath Temp.(°F.) | Molar Feed Ratio | | | C.T. (Sec.) | WWH | Mole % Per Pass Conversions to | |
|---|---|---|---|---|---|---|---|---|
| | | HC | Air | N₂ | | | Total Acid | Maleic Anhydride |
| 25 | 650 | 1 | 24 | 5 | 2.8 | .035 | 32.5 | 28.9 |
| 26 | 650 | 1 | 48 | 5 | 1.5 | .034 | 34.8 | 27.1 |
| 27 | 700 | 1 | 48 | 5 | 1.5 | .034 | 70.9 | 68.5 |
| 28 | 700 | 1 | 74 | 5 | 1.0 | .033 | 75.8 | 73.5 |
| 29 | Similar results were obtained with furan as the starting material | | | | | | | |

We claim:

1. A process for producing maleic anhydride comprising contacting a mixture of an unsaturated organic compound selected from the group consisting of n-butylenes, butadiene-1,3, crotonaldehyde and furan and an oxygen-containing gas with a catalyst at a temperature in the range of from about 650°F. to 850°F., under a pressure of from about 1 to 500 psi, and wherein the molar ratio of oxygen to the organic compound is in the range of from about 1:1 to 40:1, respectively, said catalyst having the formula:

$$A_aMo_bSb_cO_d$$

wherein A is a member selected from the group consisting of molybdenum, tungsten, magnesium, aluminum and nickel, and $a$ is a member from 0 to 0.2, $b$ is a number of from 1 to 9, $c$ is a number from 1 to 9, and $d$ is a number determined by the valence requirements of the combined elements "and wherein at least some of the molybdenum in the catalyst is at a valence state below +6."

2. The process in claim 1 wherein the catalyst is supported on a carrier material selected from the group consisting of zirconia, calcium-stabilized zirconia, silica, titania, alumina, thoria, silicon carbide, clay and diatomaceous earth.

3. The process in claim 1 wherein there is included in the mixture from 0 to 50 moles of steam per mole of the organic compound.

4. The process in claim 1 wherein the apparent contact time is from 0.1 to 50 seconds.

5. The process in claim 4 wherein the organic compound is butadiene.

6. The process in claim 5 wherein A in the catalyst formula is molybdenum.

7. The process in claim 5 wherein A in the catalyst formula is tungsten.

* * * * *

UNITED STATES PATENT OFFICE
CERTIFICATE OF CORRECTION

PATENT NO. : 3,907,834
DATED : September 23, 1975
INVENTOR(S) : Ernest C. Milberger, Serge R. Dolhyj & Harley Hardman It is certified that error appears in the above-identified patent and that said Letters Patent are hereby corrected as shown below:

Column 5: Example 16, line 5, "reluxing" should be

-- refluxing --

Signed and Sealed this

Fourth Day of January 1977

[SEAL]

Attest:

RUTH C. MASON
Attesting Officer

C. MARSHALL DANN
Commissioner of Patents and Trademarks